Jan. 9, 1940.   J. FERGUSON   2,186,718
FEEDER FOR GLASS FURNACES AND METHOD OF FEEDING GLASS
Filed Aug. 26, 1937
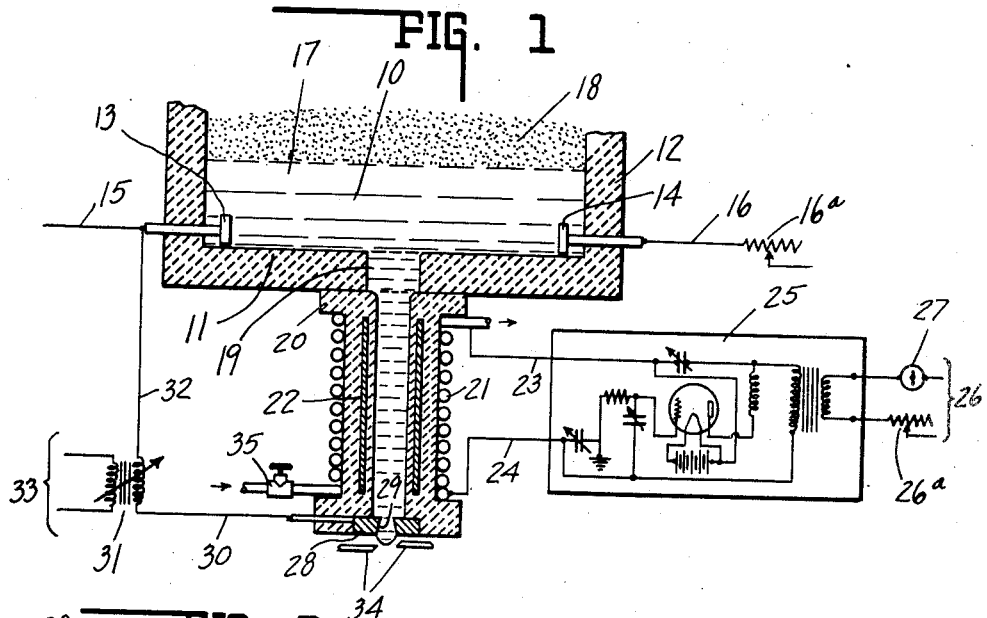
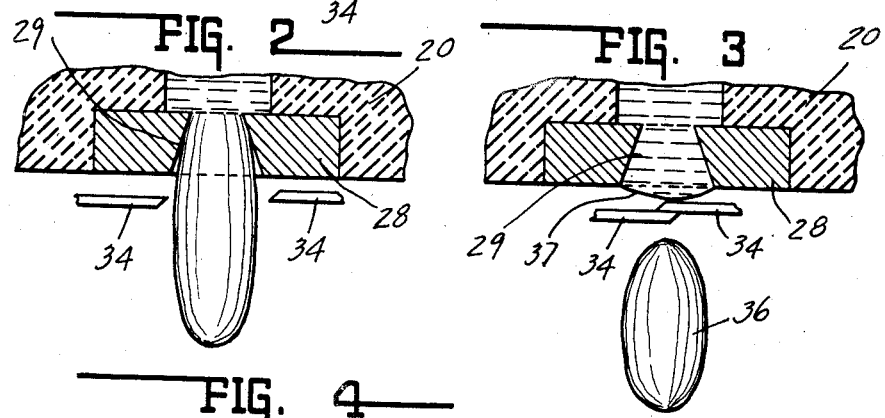
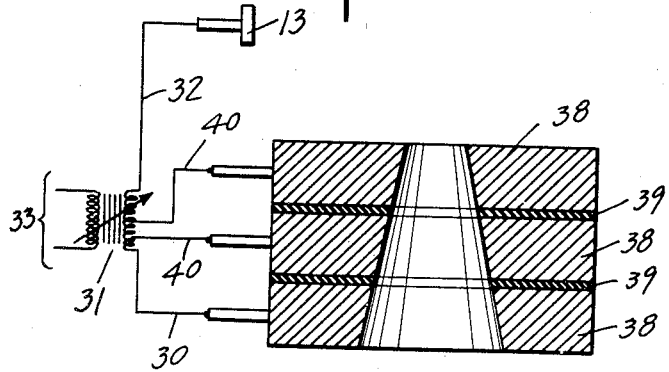
INVENTOR.
JOHN FERGUSON.
BY Lockwood Goldsmith & Galt
ATTORNEYS.

Patented Jan. 9, 1940

2,186,718

UNITED STATES PATENT OFFICE 2,186,718

FEEDER FOR GLASS FURNACES AND METHOD OF FEEDING GLASS

John Ferguson, Cleveland, Ohio

Application August 26, 1937, Serial No. 160,983

5 Claims. (Cl. 49—55)

This invention relates to a method and apparatus for discharging molten glass from a glass melting furnace and involves, first, the control of the temperature of the glass discharged so that the outflowing glass will be supplied at the proper rate and will be in the proper condition for working in the molds irrespective of the temperature in the furnace and, second, the formation of a freely flowing stream of molten glass of such form and condition that it may be sheared off in the form of gobs suitable for molding without employing the usual mechanical plunger arrangements now commonly used to form the glass into gobs. The invention is particularly applicable to a furnace in which the glass is melted by electrical energy and in which the molten glass itself acts as the resistance element in which heat for melting the batch is generated. The invention, however, is equally applicable to other types of electric furnaces and to fuel-fired furnaces.

In an electric resistance furnace, the batch is fed over the top surface and the molten glass is discharged at a lower level. Under these conditions, the batch materials are heated as they progress downward through the furnace by gravity. In this progression, the batch materials react with each other and gases are dissociated from them by both heat and chemical reaction. The result is that the glass in the lower level of the furnace is most free from bubbles or seed. It is, therefore, most desirable to withdraw the refined glass from the lowest level of the furnace, and the best method of doing so is through the floor of the furnace as illustrated in United States Patent No. 2,000,278, granted to the present inventor. Heretofore, however, it has been difficult to control the flow of glass with respect to temperature and uniformity of rate of flow so as to make it capable of being used directly for fabrication. For an open orifice, such as shown in the above-mentioned patent, the molten glass will at first flow very sluggishly due to the chilling effect of the relatively cool orifice walls, then as the hot glass communicates its heat to the orifice, the flow becomes increasingly rapid and may even increase to a point at which the outflow is greater than the rate at which the batch material may be melted. The furnace, therefore, is not well suited for continuous operation.

One object of the present invention is to provide a method and means by which glass may be discharged from the bottom of the melting chamber proper in a continuous stream at the proper temperature and consistency for working in the mold. This is accomplished by passing the molten glass through an opening in the floor of the melting chamber and thence through a vertical discharge spout to a discharge orifice placed at the bottom of the spout. The spout is provided both with cooling and heating means by which the temperature and rate of flow of the glass passing through the spout to the discharge orifice may be accurately controlled. In the ordinary operation of the furnace, it is necessary only to cool the glass coming from the melting chamber to the proper temperature. However, certain conditions may require the heating of the glass before it reaches the orifice. One or more such spouts and orifices may be provided for each furnace as desired.

Another difficulty encountered in the use of a simple orifice as shown in Patent No. 2,000,278 resides in the fact that the continuous stream of glass flowing therefrom is not of the proper form and does not flow at the proper rate to cut the necessary gobs for direct fabrication so that there will be the proper time period between gobs. This is due principally to the fact that with such an orifice the outer surface of the stream gives up heat to the orifice walls and thus becomes more viscous and flows at a slower rate than the more heated inner portion of the stream. This difference in velocity causes the stream to thin out to a diameter considerably smaller than that of the orifice and such a thin stream is not suitable for forming gobs of the proper shape for working in the molds. The difficulty cannot be corrected solely by increasing the size of the orifice since such an increase would result in too rapid flow.

Another object of the present invention is to provide for the cutting of gobs from the freely moving stream in the proper shape and weight and at the proper time intervals for direct fabrication. This is accomplished by providing means, preferably electrical, for heating the orifice walls so that the stream of glass may be maintained at a uniform temperature throughout and thus will not thin out in the manner described above. At the same time, the orifice is preferably made with a greater diameter at the bottom than at the top. With this construction, the stream of glass, when severed close to the orifice by the usual mechanical shears, tends to return partially into the orifice due to the surface tension of the material and when it does so return it is momentarily held therein by the greater total atmospheric pressure on the under side of the orifice than on the upper side of said orifice due to the difference in cross sectional area of the openings at top and bottom of the orifice member.

Other objects and features of the invention and the full nature thereof will be apparent from the following detailed specification and the attached drawing in which a preferred form of the invention is specifically described in detail:

Fig. 1 is a vertical sectional view through a glass furnace with electrical connections shown diagrammatically. Fig. 2 is an enlarged sectional view of a discharge orifice illustrating a step in the formation of a gob. Fig. 3 is a similar view illustrating another step in the formation. Fig. 4 is a sectional view of an orifice used for larger gobs of glass than that shown in Figs. 1 and 3 with the wiring connections shown diagrammatically.

In the form of the invention shown in the drawing by way of illustration, there is provided a glass melting furnace having a melting chamber 10 with a refractory floor 11 and side walls 12. The furnace here illustrated is of the electrical resistance type and has electrodes 13 and 14 connected respectively to conductors 15 and 16 which in turn may be connected to any suitable source of electric current. A rheostat 16a or other suitable voltage varying device is connected in the power main 16. Within the melting chamber there is shown a quantity of molten glass 17 with unmelted batch material 18 floating thereon. Electric current flowing through the melted glass between electrodes 13 and 14 heats the furnace and melts the batch material. The temperature within the furnace may be controlled by varying the current by any suitable means. The floor 11 is provided with a central opening 19 communicating with a vertical discharge spout 20 formed of refractory material. The spout 20 is surrounded by a coil 21 preferably of metallic tubing through which a supply of cooling liquid, for example water, may be circulated. The amount of water flowing in the coil may be controlled by a valve 35. A cylindrical metallic sleeve 22 may be inset in the spout.

The coil 21 of tubing is connected adjacent its ends to electric conductors 23 and 24 which are supplied with alternating current at a high frequency by a high frequency oscillator 25, said oscillator being supplied with alternating current at a commercial frequency from power mains 26. The coil 21 may be suitably insulated as by rubber tubing conducting the cooling water to and from the same. A switch 27 is connected in one of the power mains and a rheostat 26a or other suitable voltage varying device is connected in the other of said mains for controlling the supply of power to the oscillator. The oscillating circuits within the oscillator 25, shown in Fig. 1, are in accordance with standard commercial practice and need not be described in detail. Other means for producing high frequency current may be used.

At the bottom of the discharge spout 20 there is provided an orifice ring 28 having a central orifice 29. The orifice ring 28 is preferably of nickel chromium alloy steel or other refractory electric conducting material and is connected by a conductor 30 to one terminal of the secondary winding of a variable transformer 31. The opposite terminal of the secondary winding is connected by a conductor 32 to the electrode 13 and the primary windings of the transformer are supplied with alternating current of a commercial voltage and frequency by power mains 33. If desired, the conductor 32 may be connected to a specially provided electrode set at any suitable place within the furnace in contact with the molten glass therein. However, it is convenient to use one of the melting electrodes as shown in Fig. 1. Beneath the orifice 29 there are provided the usual mechanical shearing blades 34.

The transformer 31 supplies a low and variable voltage current through the conductor 32, electrode 13, the body of molten glass, the orifice ring 28 and the conductor 30. The highest resistance in this circuit occurs at the junction between the glass stream and the orifice ring 28 since at this point the glass has the lowest temperature and since there may be considerable contact resistance. The amount of current may be regulated by suitable means to produce sufficient heat at this point to maintain the temperature on the surface of the extruding stream of glass substantially the same as that on the inside. This result is accomplished because of the fact that a tendency to chill the outer surface of the glass results in an increased resistance in that portion and a consequent increase in the heating effect produced. The maintenance of the uniform temperature within the stream of glass prevents the thinning out of the stream as previously described and even causes the stream to expand and fill to a certain degree an orifice having a downwardly and outwardly flaring mouth as shown in Fig. 2. There may thus be produced a stream of glass of even greater diameter than the diameter of the controlling orifice. The current passing between the electrode 13 and the orifice ring likewise has a heating effect on the column of glass within the spout 20.

In the operation of the melting furnace, the glass in the lower level of the melting chamber runs from 2500° F. to 2600° F. in the manufacture of the usual type of commercial glassware. It is ordinarily fabricated at some temperature between 2000° F. and 2300° F. The glass is, therefore, received at the top of the spout 20 at too high a temperature for fabrication. In passing through the spout, however, it may be suitably cooled by proper adjustment of the water supply through the coil 21 and may be delivered to the orifice 29 within the proper temperature range for fabrication.

With a given diameter of orifice, the rate of flow of glass through the spout 20 depends upon the temperature and consequent relative viscosity of the glass at the orifice. Variations in this temperature within the range of temperatures suitable for fabrication may thus be used to regulate the rate of flow. For greater variations in rate of flow, different orifice diameters may be used. Variations in rate of flow within the permissible limits may be made by varying the current passing between the electrode 13 and the orifice ring 28, since for a slower flow it is desirable to simultaneously reduce the temperature of the orifice and the temperature of the descending glass, and to increase both temperatures simultaneously for a greater flow. At the same time, it may be advisable to increase or decrease the cooling effect by varying the flow of cooling water by means of the valve 35. In certain cases, it may even be necessary to stop the flow of cooling water entirely and to supply additional heat to the glass in the discharge spout. This may be done by closing the switch 27 and supplying high frequency alternating current to the coil 21. This current induces secondary heating currents in the glass in the spout and in the metallic sleeve 22 and their heating effect may be controlled by suitable adjustments of the rheostat 26a and oscillator 25. In general, it is desirable to have available sufficient cooling effect to completely stop the flow of glass when it is desired to shut down the furnace and sufficient heating effect to restart the flow when the glass in the spout 20 has become completely solidified. By the means just described, it is possible to control the temperature, consistency and rate of delivery of the glass from the orifice.

The shears 34 may be operated in the usual manner in timed relation with the operation of the molding machine. When the rate of flow of glass is properly adjusted and the orifice ring is properly heated, the stream of glass from the orifice drops to a position such as shown in Fig. 2 between each operation of the shears. In this position, the proper amount of glass to form a gob of the desired weight is below the level of the shear blades and may be sheared off by operation of the blades. Immediately, the portion of the stream above the shears is retracted into the orifice 29, due to its surface tension, and assumes the position shown at 37 in which the downwardly flaring orifice is completely filled. Since the bottom area of the orifice is greater than the upper area, the differential atmospheric pressure on the mass of glass within the orifice may hold it momentarily in place within the orifice. The retraction of the stream provides the necessary time interval for the retraction of the shears, and for the movement of the mold before the descent of the stream in the proper amount for the severance of another gob.

In certain conditions, it is necessary to use an orifice ring of considerable depth in order to produce the size and shape of gob desired. In that case, the orifice ring may be constructed as shown in Fig. 4 in which there are provided several segments 38 superposed upon each other and separated by plates 39 of a refractory non-conducting material. In this construction the conductor 30 is connected to the lowermost of the segments 38. The remainder of the segments 38 are connected by conductors 40 to intermediate taps on the secondary winding of the transformer 31 which provide a suitable voltage difference between the segments to insure that there will be current flow between each of the segments and the stream of glass. Thus the orifice ring and the adjacent glass may be heated throughout the depth of the ring.

From the foregoing description, it will be apparent that the invention provides for the accurate control of the temperature and rate of discharge of the glass and for the control of the size, shape and frequency of the gobs which may be sheared from the freely flowing stream of glass. The size and shape of gobs may be controlled by varying the size and shape of the orifice while the rate of flow and the final temperature and viscosity condition of the glass may be controlled by varying the heating or cooling effect on the glass within the spout 20.

Obviously these results may be obtained by mechanism which varies considerably from the form shown in detail in the drawing. For example, water cooling may not be required in all cases. If the spout 20 is made of sufficient length, air cooling by direct radiation may be sufficient to cool the glass considerably below any final desired temperature. In that case, the temperature may be controlled by the heating effect of the current passing between the electrode 13 and the orifice ring 28 or by the inductive heating effect of the high frequency current or by a combination of these means.

In some cases, the heating effect of the current between the electrode 13 and the orifice ring 28 may be sufficient for the control of the glass flow without the use of the high frequency apparatus described. On the other hand, since the orifice ring 28 lies within the electro-static and electro-magnetic field of the coil 21, it will in itself be a secondary conductor in which current flows by the inductive effect of the current in the coil 21. In some cases, these induced currents may be sufficient to heat the electrode ring without resorting to the electrical resistance heating specifically described. In certain installations, little or no heat in the spout may be required and in that case it is possible to dispense with the conductive sleeve 22 and to rely for heating entirely on the inductive effect on the glass itself or on the current to the orifice ring.

It is obvious also that the invention may be used in furnaces of other types than that shown. For example, in a fuel fired furnace in which the glass is delivered to a forehearth in which there is maintained a quantity of glass at a high temperature, the temperature controlling discharge spout and the heated orifice may be placed directly beneath the forehearth and function in that position in the same manner as described herein. Although electric heating of the orifice is much to be preferred, it may be possible in certain cases to supply heat thereto by other means,—as for example, a gas jet.

Other variations from the details of the invention as specifically illustrated herein may be made without departing from the scope of the invention as defined by the appended claims.

The invention claimed is:

1. In combination with a glass melting furnace, a member having an orifice receiving a stream of glass from said furnace at a predetermined temperature and consistency, said member being formed of an electricity conducting material, an electrode in contact with the molten glass at a position remote from said orifice member, and means for passing an electric current between said electrode and said orifice member through said glass.

2. In combination with a glass melting furnace, a discharge spout receiving a stream of molten glass from said furnace, a member having a discharge orifice receiving glass from said spout, said member being formed of an electricity conducting material, an electrode in contact with the molten glass at a position remote from said orifice member, and means for passing an electric current between said electrode and said orifice member through said glass.

3. In combination with a glass melting furnace, a discharge spout receiving a stream of molten glass from said furnace, a member having a discharge orifice receiving glass from said spout, said member being formed of an electricity conducting material, an electrode in contact with the molten glass in said furnace, and means for passing an electric current between said electrode and said orifice member through said glass.

4. In combination with a glass melting furnace, a discharge spout receiving a stream of molten glass from said furnace, a member having a discharge orifice receiving glass from said spout, said member being formed of an electricity conducting material, an electrode in contact with the molten glass in said furnace, means for passing an electric current between said electrode and said orifice member through said glass, and means for cooling the glass passing through said spout.

5. A method of feeding glass from a melting furnace which consists in flowing glass through a downwardly and outwardly flaring orifice in a unidirectional downwardly flowing stream, periodically shearing the stream at a point spaced below the orifice, and so regulating the temperature and consistency of the discharged glass and the pressure under which it is supplied to the orifice that the stub portion of glass remaining above the shearing point out of contact with the wall of the orifice during the shearing operation is momentarily retracted into the orifice and expanded into contact with flared wall.

JOHN FERGUSON.